(12) United States Patent
Spiering et al.

(10) Patent No.: US 11,766,966 B2
(45) Date of Patent: Sep. 26, 2023

(54) OPTICALLY ORGANIZED, 3-DIMENSIONALLY STRUCTURED SURFACES AND METHOD FOR THEIR PRODUCTION

(71) Applicants: FPT Robotik GmbH & Co. KG, Amtzell (DE); Tim Spiering, Memmingen (DE); Florian Karlstedt, Essen (DE)

(72) Inventors: Tim Spiering, Memmingen (DE); Florian Karlstedt, Essen (DE)

(73) Assignee: FPT Robotik GmbH & Co. KG, Amtzell (DE)

( * ) Notice: Subject to any disclaimer, the term of this patent is extended or adjusted under 35 U.S.C. 154(b) by 0 days.

(21) Appl. No.: 17/705,806

(22) Filed: Mar. 28, 2022

(65) Prior Publication Data
US 2022/0308280 A1 Sep. 29, 2022

(30) Foreign Application Priority Data
Mar. 29, 2021 (DE) ...................... 10 2021 107 881.4

(51) Int. Cl.
*B60Q 3/66* (2017.01)
*F21V 8/00* (2006.01)
(Continued)

(52) U.S. Cl.
CPC ............ *B60Q 3/66* (2017.02); *G02B 6/0043* (2013.01); *G02B 6/0055* (2013.01);
(Continued)

(58) Field of Classification Search
CPC .... B41J 3/4073; B42D 25/324; B42D 25/328; B42D 25/333; B42D 25/342;
(Continued)

(56) References Cited

U.S. PATENT DOCUMENTS

| 9,766,390 B2 | 9/2017 | Lee et al. |
| 11,435,517 B2* | 9/2022 | Pastushenko ........... G06F 3/041 |
| 2005/0275214 A1* | 12/2005 | Pokempner ............... B44F 1/10 |
| | | 283/95 |

FOREIGN PATENT DOCUMENTS

| DE | 10 2009 000 605 A1 | 8/2010 |
| DE | 10 2018 121 570 A1 | 3/2020 |

(Continued)

OTHER PUBLICATIONS

English Translation of EP 2927715 A1 (Year: 2015).*

*Primary Examiner* — Keith G. Delahoussaye
(74) *Attorney, Agent, or Firm* — Harness, Dickey & Pierce, P.L.C.

(57) ABSTRACT

An arrangement of a workpiece which is 3-dimensionally structured at least in partial surface regions, at least having a decoration applied above and/or below the structured workpiece surface, and at least one illumination source is described. The decoration comprises at least one coating material, wherein the amount of the coating material applied to the workpiece in a location-specific manner correlates with the height of the 3-dimensionally structured surface of the workpiece at this location, wherein the 3-dimensionally structured workpiece surface is at least partially translucent and the illumination source is arranged to couple light either laterally and/or at the rear and/or at the front into the workpiece surface. Furthermore, a method for coating 3-dimensionally surface-structured workpieces is presented.

12 Claims, 3 Drawing Sheets

(51) Int. Cl.
*B60Q 3/62* (2017.01)
*B60Q 3/64* (2017.01)
*B60Q 3/60* (2017.01)

(52) U.S. Cl.
CPC .............. *G02B 6/0068* (2013.01); *B60Q 3/60* (2017.02); *B60Q 3/62* (2017.02); *B60Q 3/64* (2017.02)

(58) Field of Classification Search
CPC . B42D 25/355; B44F 1/08; B44F 1/10; B44F 1/14; B60Q 3/54; B60Q 3/60; B60Q 3/62; B60Q 3/64; B60Q 3/66; F21S 43/51; F21S 43/20–251; F21S 43/26; G02B 5/1861; G02B 6/0035; G02B 6/0036; G02B 6/0043; G02B 6/0068; G09F 13/049; G09F 13/08; G09F 13/10; G09F 13/12; G09F 13/14; G09F 2013/142; G09F 2013/147

See application file for complete search history.

(56) References Cited

FOREIGN PATENT DOCUMENTS

| | | | |
|---|---|---|---|
| EP | 1 535 244 B1 | 12/2011 | |
| EP | 2 770 493 A2 | 8/2014 | |
| EP | 2927715 A1 * | 10/2015 | ............. B42D 25/29 |

\* cited by examiner

OPTICALLY ORGANIZED, 3-DIMENSIONALLY STRUCTURED SURFACES AND METHOD FOR THEIR PRODUCTION

CROSS-REFERENCE TO RELATED APPLICATIONS

This application claims the benefit and priority of German Patent Application No. 1020211078814 filed on Mar. 29, 2021. The entire disclosure of the application referenced above is incorporated herein by reference.

FIELD

The present disclosure relates to an arrangement of a workpiece which is 3-dimensionally structured at least in partial surface regions, at least having a decoration applied above and/or below the structured workpiece surface, and at least one illumination source, the decoration comprising at least one coating material, wherein the amount of the coating material applied to the workpiece in a location-specific manner correlates with the height of the 3-dimensionally structured surface of the workpiece at this location, wherein the 3-dimensionally structured workpiece surface is at least partially translucent and the illumination source is arranged to couple light either laterally and/or at the rear and/or at the front into the workpiece surface. Furthermore, the present disclosure relates to a method for coating 3-dimensionally surface-structured workpieces and to the use of the arrangement for functionalizing 3-dimensionally surface-structured workpieces in the decoration of transport means.

BACKGROUND

An intuitive interaction between an operator and a system's interface is considered a high good by many users today. While in the past the user focus was often on the basic functionality of a system, this focus has changed due to rapid developments in electronics and mechanics. Nowadays, it is taken for granted that systems function in principle; rather, it is important that successful interaction with the system can be achieved not only by trained and instructed experts, but that this can be done simply, in the best case without further prior knowledge, intuitively. The change in user expectations particularly affects complex systems such as the control of subsystems of means of transportation, which are supposed to fulfill a variety of different tasks. For example, in addition to pure driving, climate conditions, entertainment and communication should also be easily controllable without requiring a great deal of attention from the vehicle driver.

To facilitate intuitive controllability, a variety of different visual, audible, and haptic system feedbacks have been proposed in the technology, all of which aim to provide the user with easier and more reliable operation.

For example, U.S. Pat. No. 9,766,390 B2 provides an optical element capable of implementing optical images having desired shapes by a pattern design, and an illumination device using the same, the optical element comprising: a three-dimensional effect forming section provided on a first surface of a base substrate; and a multiple effect forming portion disposed in a lamination form with the three-dimensional effect forming portion, the three-dimensional effect forming portion having a plurality of main patterns successively arranged in a first direction on the first surface and each having inclined surfaces having an inclination angle with respect to the first surface, wherein the plurality of main patterns implement a line-shaped ray of a first path by guiding a first incident ray by refraction or reflection from the inclined surfaces in a first surface direction, the plurality of effects forming section being successively arranged in a second direction crossing the first direction and having a plurality of optical patterns.

EP1535244B1 discloses a method for generating two-dimensional image information from a structured surface, from a body or from a space, in particular for two-dimensional reproduction of the surface, the body or the space with a 3D appearance, the method comprising the following method steps: Scanning the surface, the body or the space to generate two-dimensional image information (2D data) by means of a 2D scanner and scanning the surface, the body or the space to generate three-dimensional image information (3D data) by means of a 3D scanner linking the 2D and 3D data according to a predeterminable rule for deliberate drawing amplification and two-dimensional representation of an image thus obtained, wherein, during the drawing amplification, the 3D data or the further processed 3D data are added to the 2D data as additional image information in such a way that a 3D appearance of the combined data is generated or amplified, characterized in that the mixing or linking of color image information and depth information is carried out by means of a 3D scanner. information and depth information according to a distance matrix obtained from the 3D data is carried out in such a way that the color image information is modulated with respect to brightness and/or color value and/or saturation, the 3D data being represented as a black/white image and the drawing amplification being carried out by multiplying the brightness values of the color image and of the black/white image.

EP 2 770 493 A2 describes an advertising display device having a three-dimensional (3D) sheet, comprising: a substrate; a backlight unit disposed on the substrate and emitting light; and a 3D sheet disposed on the backlight unit to display a 3D image by the light emitted from the backlight unit.

Such solutions known from the prior art can offer further potential for improvement. This refers in particular to the situation-specific marking of 3D surface structures by means of a switchable highlighting and leveling of these structures, as well as an associated improved and facilitated detectability and operability by a user.

It is therefore the task of the present disclosure to at least partially overcome the disadvantages known from the prior art. In particular, it is the task of the present disclosure to provide an arrangement which permits an improved optical structuring adapted to the requirements and thus an improved operability of a surface by a user. Furthermore, it is the task of the present disclosure to provide an arrangement which can function as an adaptable man-machine interface by the possibility of actively and quickly changing optical properties.

SUMMARY

The task is solved by the features of the independent claims, directed to the arrangement according to the disclosure, the method for its manufacture according to the disclosure and the use of the arrangement according to the disclosure. Preferred embodiments of the disclosure are indicated in the dependent claims, in the description or in the figures, whereby further features described or shown in the dependent claims, in the description or in the figures may individually or in any combination constitute an object of the disclosure, as long as the context does not clearly indicate the contrary.

According to the disclosure, an arrangement of a workpiece which is 3-dimensionally structured at least in partial surface regions at least comprises a decoration applied above and/or below the structured workpiece surface and at least one illumination source, wherein the decoration comprises at least one coating material, the amount of coating material applied to the workpiece in a location-specific manner correlating with the height of the 3-dimensionally structured surface of the workpiece at this location, the 3-dimensionally structured workpiece surface being at least partially transparent to light and the illumination source being set up to couple light into the workpiece surface either laterally and/or at the rear and/or at the front.

Surprisingly, it was found that three-dimensional surface-structured workpieces can be provided via the arrangement according to the disclosure, which, compared to the functionalized surfaces of the prior art, provide a visually distinctly structured surface profile to potential users of the workpiece surfaces. There is a synergistic effect of optical and haptic feedback to the user, the surface structure of the workpiece can be captured and structured more quickly. The individual areas of the surface of the workpiece are highlighted in a clearly separable manner by the targeted coating in conjunction with the illumination, and the improved perceptibility prevents operating errors. Furthermore, the improved perceptibility also makes it immediately clear to users at which points of the surface further surface functionalities can be expected at all. In addition, the arrangement according to the disclosure can also provide a system which permits visual feedback to the user in an improved manner. Due to the special highlighting of the three-dimensional surface structure, further options for action can be displayed and queried, which cannot be done in this way with the prior art solutions. In particular, the design according to the disclosure also makes it possible to increase the detectable spatial resolution on the workpiece surface, which leads to further facilitation of operability in the case of desired feedback with electronic systems. In sum, this arrangement results in a more intuitive system that allows the operation of even complex devices with a lower level of attention. This arrangement can also be used to particular advantage when further haptic input from the user is desired, for example in the form of interaction with a switch. In these cases, the definitions of the switch surface can be designed to be much more perceptible, whereby this can reduce the risk of operating errors. Furthermore, it is advantageous that with the arrangement according to the disclosure it is possible to actively adapt the optical nature of the surface to ambient situations. For example, depending on the ambient brightness, a different illumination intensity for the arrangement can initially ensure consistently good detectability. Furthermore, the sharpness of information contained in the 3-dimensionally structured surface can be actively controlled. The latter can consist, for example, in the fact that surface structures are first optically "hidden" and only highlighted when required. This "switchability" of the information can be adapted to changing environmental and input situations, which significantly promotes clarity and usability for the user. Interestingly, it has been shown that these features of the arrangement according to the disclosure are of particular advantage for modern means of transport with a large number of sensor systems for monitoring the driving situation, since with the arrangement according to the disclosure, driving situations detected by the vehicle can be communicated further to the user of the means of transport quickly and effectively. In addition, the present disclosure allows control elements integrated in the surface to be shown or hidden in accordance with the situation without having to use a corresponding display for this purpose. Thus, the clarity and operability for the user are substantially promoted. The prior art usually uses displays for such applications, but these are disadvantageous in terms of weight, power consumption and robustness.

The arrangement according to the disclosure comprises a workpiece with a 3-dimensional surface structure at least in partial areas. The basis of the disclosure is a workpiece with a surface, wherein the surface is not flat but has elevations and depressions. The elevations and depressions can form patterns, for example by regular arrangements between the elevations and depressions, or irregular surface structures. The surface structures on the workpiece have a certain extent so that they can be perceived visually and haptically. Workpieces which have only a surface roughness are not surface-structured workpieces within the meaning of the disclosure. Surface-structured workpieces which can be used according to the disclosure can be regarded, for example, as films or sheets which have a surface which is not flat, but which has a regular or irregular structure, for example as a result of partial mechanical or thermal shaping of the film. The surface does not have to be structured over the entire area. It is sufficient for a certain proportion of the surface to be structured. This structured part does not include separate structures such as mechanical switches etc. The surface can be flat, or it can have single or multiple curvatures.

Furthermore, the 3-dimensionally surface-structured workpiece has a decoration applied above and/or below the structured workpiece surface. The three-dimensional surface-structured workpiece is also characterized by a decoration which is located above, below or on both sides of the workpiece surface. The indications "below" and "above" refer to a possible application situation. Using the example of a structured foil as a workpiece, this means that the surface side facing a potential user is referred to as the "top side". The surface side of the foil facing away from the user is the "bottom side". Either the top side, the bottom side or both sides of the workpiece thereby have a further pattern in the sense of a decoration. A decor is a pattern or intentional ornamentation of the workpiece. The decoration comprises at least one coating material. The additionally applied pattern or the intentional ornamentation of the decor can thereby typically be achieved via the application of at least one coating material. However, it is also possible to realize the decoration by means of an ablative process, in which first a color is applied over the entire surface and then this color is locally selectively removed again, at least partially.

The arrangement comprises at least one illumination source, wherein the illumination source is arranged such that light can be coupled into the workpiece surface either laterally, and/or from the rear and/or from the front. In addition to the surface-structured workpiece provided with a decoration, the arrangement according to the disclosure also comprises at least one illumination source. An illumination source in the sense of the disclosure is an electrical device which is capable of emitting light of one or more wavelengths. Via the introduced light, the optical properties of the surface can be changed in a controlled manner and this forms a control element for the perceptible, optically amorphous properties of the surface. Possible illumination sources include light bulbs, halogen lamps or LEDs. The illumination source emits light and the light is directed into or onto the workpiece surface. The light can be coupled into the workpiece surface, for example, by irradiating the workpiece surface from behind or from the front with light from the illumination source. However, it is also possible that the light from the illumination source is input laterally into the workpiece surface. In the case of a structured foil, the lateral coupling into the workpiece surface means that the light is not directed onto, but into the foil. By coupling the light, an additional contribution to the ambient light is always made. Pure illumination of the workpiece surface by incident ambient light does not correspond to the characteristic of coupling light into the workpiece surface.

The amount of coating material applied to the workpiece in a location-specific manner correlates with the height of the 3-dimensionally structured surface of the workpiece at that location. The decoration applied to the workpiece does not fulfill the purpose of a purely optical decoration of the workpiece, but results from a directly functional property of the workpiece itself. The latter is achieved by the fact that the location-specific applied amount of coating material at this location is not arbitrarily chosen, but results as a function of the height, or in other words the thickness, of the workpiece at this location. The height of the three-dimensional structured surface results from the arrangement of heights or depressions at this location of the workpiece. If, for example, the surface of the workpiece at this location is such that a mountain results in the direction of the user, proportionally more coating material is applied at this location of the workpiece. If there is a depression at this point of the workpiece, less coating material is applied at this point. The height of the workpiece can be obtained mathematically, for example, via the difference between the height of the surface at this point and the average height of the workpiece. The higher a surface point is above the average height or thickness of the workpiece, the more material is applied at that point; if the height is below that, less or no material is applied. This normalization to the height of the surface can be done over the entire workpiece or only over the desired coating area of the workpiece.

The 3D-structured workpiece surface is at least partially translucent. In this respect, not all materials are suitable for the arrangement according to the disclosure. The workpiece as such must consist of a material which is at least partially transparent to light. A workpiece surface or a workpiece is partially light-transmissive if the transmission of the workpiece for IR, UV or visible light of wavelengths greater than or equal to 380 nm and less than or equal to 780 nm is greater than or equal to 10%, further preferably greater than or equal to 25% and further preferably greater than or equal to 40%.

Within a preferred embodiment of the arrangement, the decoration may comprise, at least in sections, at least two different coating materials, wherein the amount of one coating material applied to the structured workpiece in a location-specific manner correlates with the height of the 3-dimensionally structured surface of the workpiece at that location, and the amount of the other coating material at that location is anti-proportional to the amount of the first coating material. In addition to the use of only one coating material, it has been found to be particularly suitable for highlighting and functionalizing the surface of the workpiece that the improved operability is achieved via the use of two different coating materials. Through this use, the functional effect of coating and highlighting the surface structure of the workpiece can be achieved more efficiently. To achieve the improved effect, the two coating materials are applied anti-proportionally in their site-specific amounts.

This means, for example, that at the maximum of the height of the workpiece surface, only one coating material is present and the other is applied in a zero quantity. At the minimum of the workpiece surface, the other coating material is then correspondingly present in its maximum quantity and the first coating material in a zero quantity. The further heights of the surface-structured workpiece are coated with both materials, with alternating compositions of the first and second coating materials being applied as a function of height. The different coating materials can be, for example, different colors or generally coating materials with controllable properties such as absorption or transmission.

In a preferred embodiment of the arrangement, the workpiece may be made of a material selected from the group consisting of polycarbonate, polystyrene, polymethyl methacrylate, polymethacryl methylimide, polyvinyl chloride, polyethylene terephthalate, glass, or combinations of at least two materials thereof, and the thickness of the workpiece may be greater than or equal to 1.5 mm and less than or equal to 2 cm. In order to achieve a particularly suitable optical structuring of the surface of the workpiece, it has been found to be particularly suitable for the workpiece to consist of or comprise the above-mentioned polymers or ceramics. The optical and mechanical properties of these materials are such that mechanically stable workpieces are provided in the specified thickness range, which also provide the necessary optical properties for improved usability. Further preferably, the thickness of the workpieces can be greater than or equal to 2 mm and less than or equal to 1.5 cm, further preferably greater than or equal to 5 mm and less than or equal to 1.25 cm. Preferably, workpieces made of these materials may be in the form of structured, for example thermoformed or otherwise structured, films or sheets.

In a preferred aspect of the arrangement, the transmission of the workpiece averaged over the workpiece surface may be in a wavelength range of greater than or equal to 380 nm and less than or equal to 750 nm, greater than or equal to 15% and less than or equal to 100%. In order to obtain the most angle-independent and uniform highlighting of surface structures and thus significantly improved operability, it has proven favorable for the transmission of visible light to lie within the transmission range specified above. Lower transmission values are not preferred, as this may result in insufficient highlighting of the surface structures. Furthermore, the transmission in the wavelength range indicated above may be greater than or equal to 25% and less than or equal to 100%, further preferably greater than or equal to 50% and less than or equal to 100%. The transmission of the workpiece can be determined by a simple transmission measurement on the structured, uncoated workpiece. Further preferably, the illumination source can emit light with a wavelength greater than or equal to 405 nm.

Preferably, the refractive index of the workpiece material can be greater than or equal to 1.2 and less than or equal to 1.59. In order to achieve the most uniform and angle-independent effect of the coating of the workpiece surface, it has been found to be advantageous for the uncoated workpiece to have a refractive index in the range indicated above. Within this refractive index range, very specific optical surface defects can be created, with significantly better differentiation of surface heights and depressions.

Within a further preferred characteristic of the arrangement, the ratio of maximum elevation of the textured and undecorated workpiece surface to mean workpiece thickness, expressed as maximum thickness from the back of the workpiece divided by mean workpiece thickness, may be greater than or equal to 1.1 and less than or equal to 3. In order to achieve an effect that is as uniform as possible and independent of the viewing angle, it has been found to be advantageous for the surface structuring of the workpiece to lie within this limited range. This means that the heights and depressions achievable via the surface structuring are limited in comparison to the average workpiece thickness. This avoids excessively high mountains on the workpiece surface or excessively deep valleys. The ratio is obtained via the average workpiece thickness, for example the thickness of the film or sheet used for production, and the maximum achievable extension, the thickness, of the sheet after surface structuring. For the latter parameter, of course, it is not the thickness of the workpiece at this point that applies, but the deflection of the workpiece achieved at this point. For example, if a 1-mm-thick sheet is thermoformed and a 3-mm-high protrusion is generated at one point, the result is a ratio of three. In a further preferred embodiment, in addition to or independent of the height relation, the maximum depth of the relief of the 3D textured surface may be greater than or equal to 2% and less than or equal to 50% of the layer thickness of the carrier sheet. Further preferably, the ratio may be greater than or equal to 1.25 and less than or equal to 2.5, further preferably greater than or equal to 1.5 and less than or equal to 2. Within these size ranges, very distinct visual differences in the textured surface can be generated.

Within a preferred embodiment of the arrangement, the illumination source can be set up to couple light into the workpiece from the rear and from the side. To enhance the optical perceptibility of the structuring of the surface, it has proved particularly advantageous to irradiate the workpiece with light from two different directions. In this case, the light is coupled in from the back of the workpiece, i.e. the side facing away from a potential user, and also laterally into the workpiece. This light coupling from two different directions can be achieved, for example, by using a light source with two light guides or by using two different light sources. The coupling into the side of the workpiece can take place in each of the four side surfaces of the workpiece.

In a preferred embodiment of the arrangement, the arrangement may additionally comprise a control unit and a detection unit, wherein the detection unit is arranged to detect an approach to the arrangement and to output a corresponding signal to the control unit, and the control unit is arranged to control the coupling of the light as a function of the output signal of the detection unit. For particularly efficient highlighting of the surface structures of the workpiece, it has been found to be advantageous that the angle-dependent observation of the surface by a user is included in the highlighting of the structuring. For this purpose, for example, a detection unit can detect the approach to the workpiece surface and transmit the direction of the approach to a control unit. The control unit determines the direction of approach to the workpiece surface from the signals and controls the intensity of one or more illumination sources as a function of the direction of approach. By this embodiment, for example, an approach from the right, from the left, or from the front can trigger a different switching pattern or intensity distribution of one or more illumination sources in the arrangement according to the disclosure. It is also possible for the detection unit and the control unit to track the approach in a time-resolved manner, so that a different lighting program is switched as a function of the detected approach direction and distance. For example, the intensity components of the individual lighting sources or the components of other lighting sources can change over time as a function of the specific approach situation.

In a preferred embodiment of the arrangement, the arrangement can have at least two different illumination sources, wherein both illumination sources can be controlled independently of each other in their optical properties via the control unit. In particular, by using at least two illumination sources, particularly large changes in the optical properties of the workpiece can be produced via the arrangement according to the disclosure, wherein both the reduction in the perceptibility of the surface structuring and the particular highlighting of selected, 3-D shaped areas can be particularly large. This can increase the usability of the surface in particular.

In a preferred aspect of the arrangement, the coating material may be selected from the group consisting of curable liquid with color pigments, curable liquid with metal particles, curable lacquers, or combinations of at least two materials thereof. In order to obtain the most durable and particularly concise highlighting of the three-dimensional structure of the workpiece surface, the above-mentioned coating agents have proved to be particularly suitable. The liquids can be used, for example, in the form of color liquids, i.e. solvents with organic or inorganic color pigments, or in the form of solvents or pastes with inorganic metal particles. The term "curable" in this context means that the liquids preferably comprise substances which are capable of a chemical reaction, a crosslinking, with each other. These can be, for example, monomers which react with each other to form larger polymers on the basis of an external stimulus, for example in the form of irradiation or heating or by pure evaporation of the solvent. Through this mechanism, the applied liquids can be permanently fixed at the application site.

In a further preferred characteristic of the arrangement, the decoration may comprise at least two different coating materials with different colors according to the HSV color wheel, the at least two location-sensitively applied colors on at least 75% of the printed area enclosing an angle of greater than or equal to 170° and less than or equal to 190° on the HSV color wheel or having at least a difference of 30 percentage points in their brightness value. In order to enable particularly pronounced highlighting of the three-dimensional surface structures, it has proved particularly suitable for two different coating agents to be used which are based on complementary colors. The color solutions used for coating thus have colors which are opposite each other, for example, on the HSV color circle or a cylindrical representation thereof. The determination of the corresponding coordinate representation of the two coating materials on the color circle is known to the skilled person. The difference in brightness value is also intended to include printing with actually "uncolored" but complementary, i.e. black/white, coating materials.

In a further preferred embodiment of the arrangement, the decor can comprise at least two coating materials with different reflectance and/or absorption properties, wherein at least two of the location-sensitively applied coating materials have an integral difference in light absorption in the range from 280 nm to 780 nm of greater than or equal to 50%. In addition to differentiating the two coating materials that can be used by means of the selected color, it is also possible to achieve particularly efficient highlighting of the three-dimensional surface structure by selecting coating materials that differ in their light absorption. The integral light absorption can be determined in the wavelength range indicated above by means of simple absorption measurements, for example using a UV-V is instrument. Further preferably, the selection of the color pigments can be made as a function of the radiation coupled in from an illumination source and can be tuned in such a way that the coupled-in radiation is amplified as far as possible or reduced as far as possible by the color pigments.

In a preferred aspect of the arrangement, the decoration may be applied to the back surface of the workpiece, wherein the thickness of the coating is greater than or equal to 0.01 mm and less than or equal to 3 mm. In order to achieve the greatest possible highlighting of the surface structures of the three-dimensional surface of the workpiece, and in order to achieve an effect that is as independent of angle as possible, the thicknesses of the coating materials after drying indicated above have been found to be particularly suitable. Preferably, the thickness of the coating can be greater than or equal to 0.05 mm and less than or equal to 2 mm, further preferably greater than or equal to 0.02 mm and less than or equal to 0.2 mm. Preferably, a further coating layer may be applied below the decoration of the two coating materials. Further preferably, this further coating layer may consist of a coating material selected from the group consisting of curing liquid with color pigments/curing liquid with metal particles or combinations of at least two components from this group, wherein the thickness of the coating corresponds at least to the height-dependent, location-sensitive coating.

Within a further preferred embodiment, the position-dependent height of the 3-dimensional surface-structured workpiece can be designed to be variably controllable, at least in partial areas. For special clarification of the surface structure to a potential operator, it has turned out to be particularly favorable that the surface structure, and here in particular the height, can be varied, for example, via a control unit. In particular, this means that the height of the surface can be changed in certain partial areas. Furthermore, this can mean that the residual stress of the arrangement can be changed in certain partial areas of the surface, so that, for example, the refractive index of the material can be adjusted via an electrically induced, local deformation. Based on the fact that a deviation to the proportionality of the applied coating materials is achieved via the variable height at this position, a congruence with the coating materials can be achieved once and a dissonance with it once via the variable height. This embodiment is thus capable of highlighting surface structures in particular only temporarily and facilitating the operation of switches or buttons in particular.

In a preferred embodiment of the arrangement, the workpiece surface may be, at least in sections, single or double curved and the curvature of one or both curvatures may be greater than or equal to 0.001 mm and less than or equal to 0.5 mm. Curved surfaces are generally understood to be those surfaces that can be transformed into the Euclidean plane only by unwinding. These are characterized by the fact that concave and/or convex curvatures are present only in the longitudinal or transverse direction and a straight line can be described for each point of the plane, which runs orthogonally to the course of curvature. These workpieces have, at least in sections, a non-planar surface. The workpiece surface therefore exhibits height differences and differences in the slope of the surface. Due to the height differences and due to the slope of the surface, the surface of the workpiece is curved. The workpieces may also have partially bidirectionally curved surfaces. A surface is bidirectionally curved in the sense of the disclosure if a part of the surface, in the mathematical sense, has a curvature in at least two different directions. Even for these difficult surface geometries of the workpieces, the arrangement according to the disclosure can help to improve operability. The same applies to the highlighting of surface areas, for example in the event of an imminent collision. The curvature of a surface at a defined point on the surface can be determined by applying tangents to the surface curve. The mathematical procedures for this are known to the skilled person. Further preferably, the radius of curvature can be greater than or equal to 5 mm and less than or equal to 50 cm and further preferably greater than or equal to 1 cm and less than or equal to five and 20 cm.

In a further preferred embodiment of the arrangement, the mean roughness value of the surface structuring can be less than 1.2. With these mean roughness values in particular, a particularly favorable highlighting of the surface structure of the workpiece can be achieved by the arrangement according to the disclosure.

Furthermore, according to the disclosure is a process for coating 3-dimensionally surface-structured workpieces by means of an inkjet process, which comprises at least the process steps:
a) Provision of a 3-dimensional surface-structured workpiece;
b) location-sensitive printing of the workpiece by means of an ink-jet process, wherein, at least in sections, at least two different coating materials are applied to or below the surface of the workpiece, the amount of one coating material applied to the workpiece in a location-specific manner correlating with the height of the 3-dimensionally structured surface of the workpiece at this location and the amount of the other coating material at this location being anti-proportional to the amount of the first coating material.

This process according to the disclosure can be particularly suitable for the further functionalization of surface-structured workpieces. The surface structuring of the workpiece can be particularly emphasized by this process and the further possibility of particularly simple operability is created. The latter can result in particular from the surface being functionalized, for example, by means of touch-sensitive switches and/or capacitive surface areas which are designed to be location-sensitive to a mechanical or haptic input from a user. The improved delimitability of the individual surface areas allows operating errors to be minimized.

The process according to the disclosure is a method for coating 3-dimensional surface-structured workpieces by means of inkjet printing. The coating materials can be applied to the structured surfaces by means of digital coating processes, such as inkjet processes. The fundamental principle is based on a relative movement between a print/coating head and the surface to be coated. The latter can then be coated directly by ejecting coating liquids from the print head.

In process step a), a 3-dimensional surface-structured workpiece is provided. 3D workpieces are workpieces which, at least in sections, have a non-planar surface. The workpiece surface therefore exhibits height differences and differences in the slope of the surface. Furthermore, in addition to the location-dependent height differences, the surface of the workpiece can also be curved in one or more directions.

In process step b), the workpiece is printed in a location-sensitive manner using an ink-jet process. The term location-sensitive printing of the workpiece implies that the amount of coating agent applied to a specific surface point of the workpiece may not be constant over the workpiece but variable. In particular, this does not mean that one or more coating agents are applied in a constant amount to all surface points of the workpiece.

The location-sensitive printing is carried out, at least in sections, with at least two different coating materials above or below the surface of the workpiece, the amount of one coating material applied to the workpiece in a location-specific manner correlating with the height of the 3-dimensionally structured surface of the workpiece at that location, and the amount of the other coating material at that location being anti-proportional to the amount of the first coating material. This requirement has already been discussed in the context of the arrangement according to the disclosure, and reference will be made to the arrangement according to the disclosure with respect to its advantages.

In a preferred embodiment of the method, the coating of the surface can be carried out in such a manner that, when a coating device is used, only those partial areas of the surface are coated on which the edges of a part of the coating device exit surface projected planarly onto the arrangement L·B of the coating device, where L normal and B vertical to the movement vector of the coating device represent the maximum projected distance of the coating nozzles of the coating device on the surface, can be connected by an ellipse which satisfies the conditions of $$\frac{x^2}{\frac{B^2}{2}} + \frac{y^2}{\frac{k^2}{2}} = 1$$

in the plane normal to the motion vector of the coating instrument and $$\frac{x^2}{\frac{L^2}{2}} + \frac{y^2}{\frac{k^2}{2}} = 1$$

vertical to the motion vector of the coating instrument, where $1<k<30$ and $x, y \in \mathbb{R}$. Within this embodiment, it has surprisingly been shown that in particular two-dimensional curved surface areas can be coated with high quality and obtain a particularly clear expression of the surface structures by the process according to the disclosure.

In a further preferred embodiment of the process, the trajectory of the coating device over the partial areas to be coated and the control of the coating device during the coating process can be selected in such a way that the impact speed of the coating agent over the entire coated partial area lies within a defined speed range. This design has proven to be particularly suitable for profiled 3D surfaces compared to other approaches, for example via a rigid tolerance range with regard to a defined maximum and minimum distance of the coating head to the surface. By means of this boundary condition, the parameters necessary for the execution of a high-quality coating on complex surface geometries, such as droplet size, viscosity of the coating agent and the resulting pulse velocity after ejection from the coating nozzle, can be determined in a very targeted manner. In this way, for example, a more homogeneous coating with significantly improved surface perception is produced.

In a preferred variation of the method, coating of the workpiece may be accomplished by ejecting at least one coating agent from a print head which is moved relative to the surface of the workpiece in one or more paths, coating only those surface points of the workpiece at which the normal vector $\vec{a}$ of the surface point in relation to normal vectors $\vec{b}$ of the same point on an enveloping curve of the workpiece area, the enveloping curve extending perpendicularly to the direction of movement of the print head and connecting, over a distance greater than or equal to 1 cm on both sides of the point under consideration, the surrounding maxima of the surface textures whose normal vectors fulfill the following mathematical relationship $$\arccos\left(\frac{\vec{a} \cdot \vec{b}}{|\vec{a}| \cdot |\vec{b}|}\right) \leq 80°.$$

In this preferred embodiment of the process, it is ensured that in cases where the workpiece surface has a particularly challenging structure, only those surface areas are coated which can be coated reproducibly and in the necessary layer thickness by means of the inkjet process. This design can avoid coating errors and contribute to a particularly suitable highlighting of the workpiece surface.

Furthermore, the use of the arrangement according to the disclosure for functionalizing 3-dimensional surface-structured workpieces in the decoration area of vehicles or means of transport is in accordance with the disclosure. The arrangement according to the disclosure can make a particular contribution to facilitating the operation of complex electrical systems in vehicles or means of transport. Via the achievable enhancement of the perceptibility of the surface structures of workpieces, information or switch elements in particular can be highlighted in a particularly efficient manner, whereby position-dependent effects and influences of the operator in particular can also be compensated for by the arrangement of the light sources. Due to the improved structuring of the workpiece surface, operating errors can be efficiently prevented. Vehicles in the sense of the disclosure include in particular motor vehicles, aircraft or rail vehicles, as well as electrically driven vehicles. Means of transport may include, for example, aircraft, buses or the means of transport of local public transport. The decoration area preferably arises in the vehicle interior, whereby surfaces in the area of the vehicle cockpit in particular can benefit from the use of the arrangement according to the disclosure. Within the scope of a preferred embodiment of use, the arrangement can be used in particular to continue design themes depicted on other arrangements in the visible area of vehicles and means of transport.

Further advantages and advantageous embodiments of the objects according to the disclosure are illustrated by the drawings and explained in the following description. It should be noted that the drawings are descriptive only and are not intended to limit the disclosure.

BRIEF DESCRIPTION OF THE DRAWINGS

It shows the.

DETAILED DESCRIPTION

Figure 1:
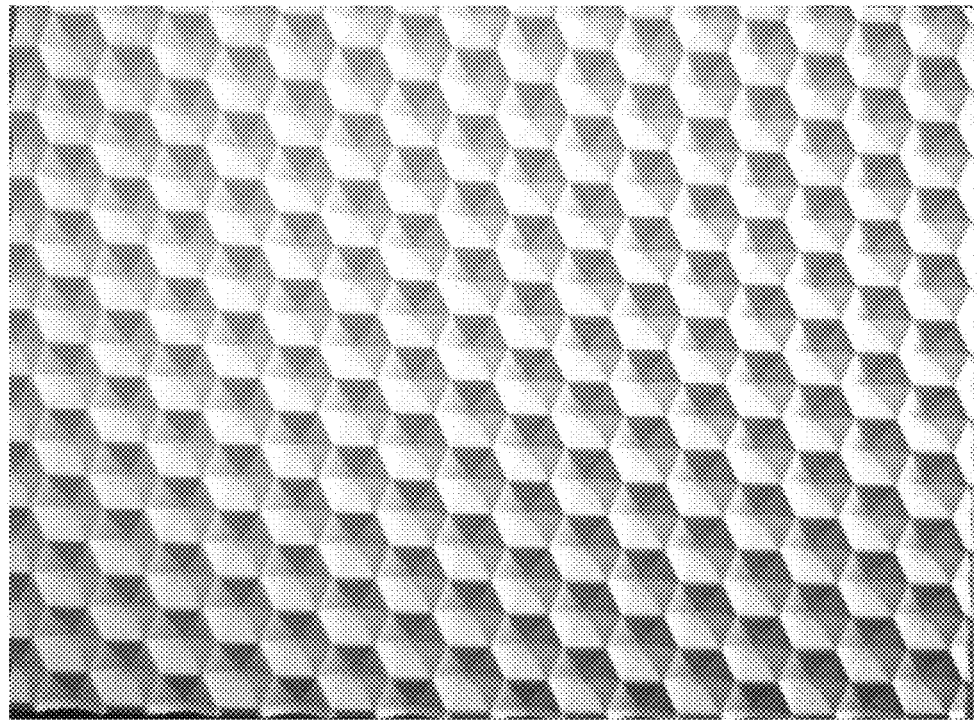
FIG. 1 the reverse side of a 3-dimensional surface-textured workpiece and a bi-color coating according to the disclosure with 100% white as the final layer.

FIG. 1 shows the reverse side of a workpiece textured in 3-D on the reverse side. The profiling is in the form of a hexagonal honeycomb pattern, with the center of the honeycomb higher than the other surface points. The material of the workpiece is a profiled PMMA sheet, transparent in the honeycomb edges 3 mm thick, which has a light transmittance of 92% when uncoated. The result is a 3-dimensional surface profile with, in relation to the average thickness of the workpiece, peaks and valleys. The workpiece is inherently uncurved, i.e. flat. The reverse side of the workpiece was first subjected to a coating according to the invention using two colors, black and white, with the location-dependent coating being applied in shades of gray. The gray levels are obtained as a locational function of the coating piece, with the height of the workpiece at this point representing the proportionality factor of the gray level. The highest elevations of the workpiece surface were coated with white paint, the lowest depressions of the surface with black paint. The remaining surface points were given a gray shading with the gray value corresponding to the height. This bi-color coating was then additionally coated with monochromatic white on the underside. The layer thickness of the bi-color coating was 0.01 mm at its highest elevation. The layer thickness of the additional contrasting top layer was approx. 0.012 mm.

Figure 2:
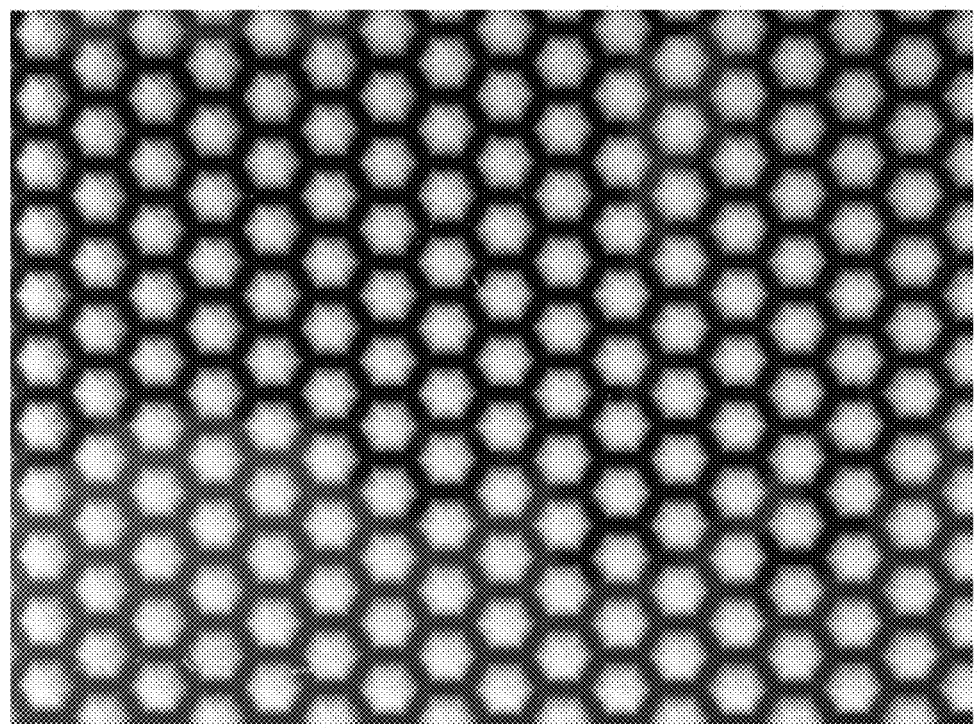
FIG. 2 the front side of the 3-dimensional surface-structured workpiece shown in FIG. 1 with a bi-color coating on the back side according to the disclosure without coupling of light.

FIG. 2 shows the corresponding surface of the workpiece from FIG. 1 from the unstructured, flat front side. Due to the transparent material of the workpiece, the coated rear side is visible. The rear side of the workpiece is provided above the white top coating, i.e. towards the workpiece, with a coating of two complementary colors, black and white, according to the invention. The 3D-surface profile was coated in such a way that the maximum height in the direction of the front side (mountain) is visible with pure white and the maximum depression in the direction of the rear side is visible with pure black (depression). The height levels in between were coated using a combination of both colors with correspondingly correlating shades of gray. The result is an optical image without further highlighting/functionalization of certain subareas or the corresponding height levels of the relief.

Figure 3:
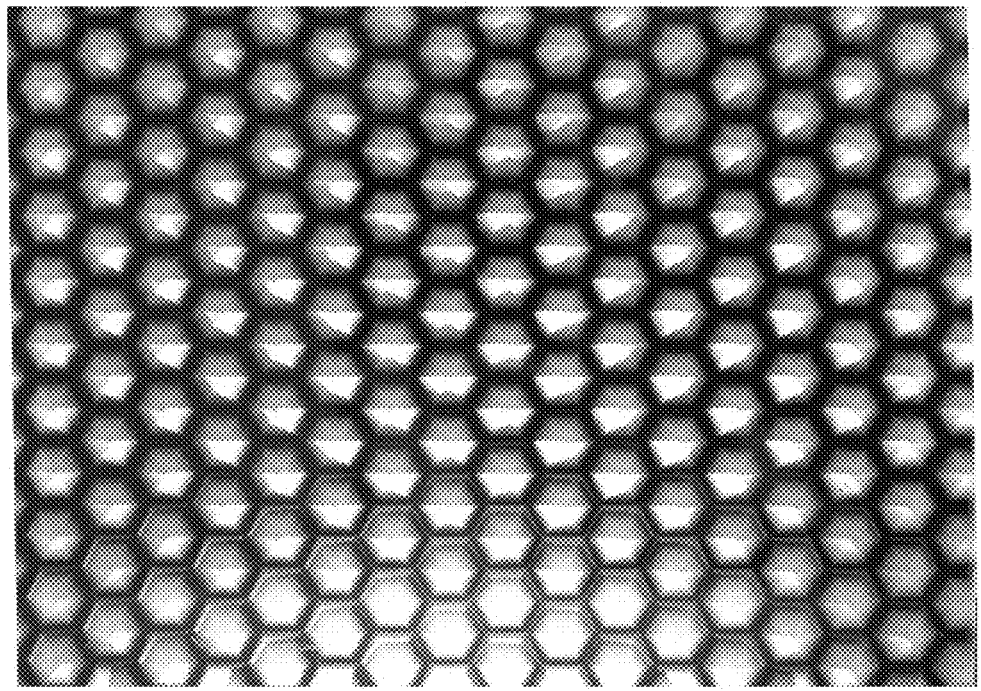
FIG. 3 the front side of the workpiece coated according to the disclosure of FIGS. 1 and 2 with a lateral coupling of light.

FIG. 3 shows the 3-D surface-structured workpiece of FIGS. 1 and 2 with a bi-color coating on the back according to the invention, a top layer and an additional coupling of white light by a point light source. The light is coupled in from the side. The 3-D profiling of the surface at the point of light coupling is clearly highlighted. The elevation levels stand out clearly, making it easier, for example, to perceive and find heights and valleys in the surface. This highlighting makes it easier for users to recognize and operate switches and buttons, and the perceptibility of the surface can be actively changed and controlled by controlling the intensity, the direction of incidence and the wavelength mixture of the coupled light.

Figure 4:
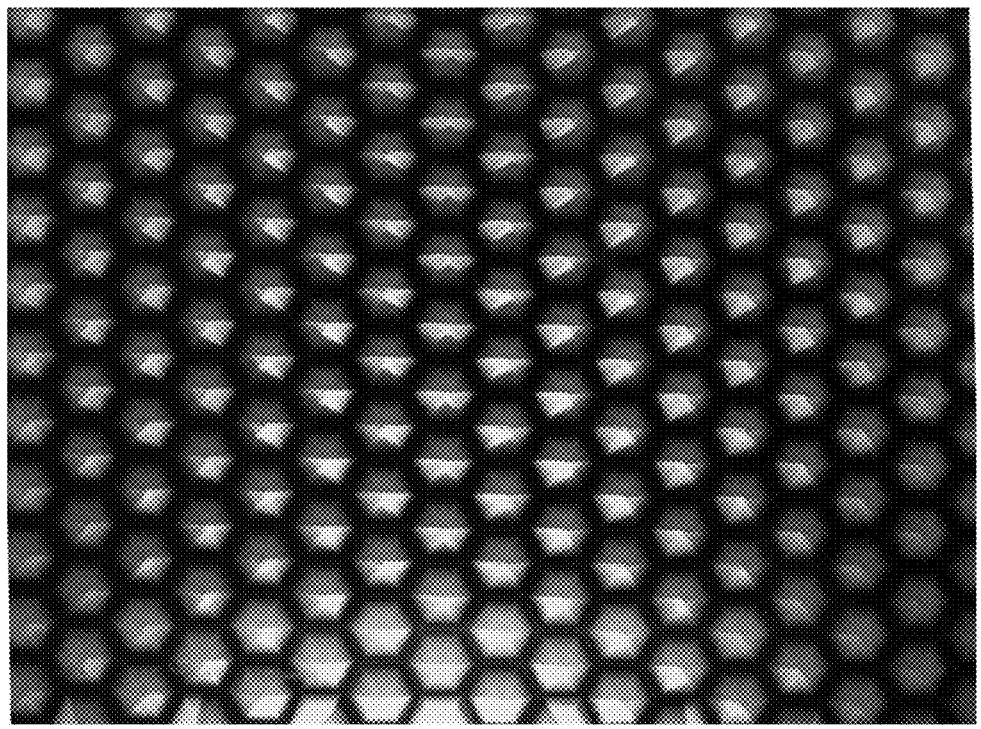
FIG. 4 the front side of the workpiece coated according to the disclosure of FIGS. 1 to 3 with variation of the lateral angle of incidence of the light source.

FIG. 4 also shows an arrangement according to the invention, identical to the workpiece in FIG. 1 and FIG. 2, consisting of a workpiece surface, a complementary color coating on the back and with additional coupling of white light into the workpiece by a point light source. Compared to FIG. 3, the angle of incidence of the point light source is changed. The light is coupled into the workpiece from the side. The height levels of the textured workpiece surface are clearly highlighted, with the change in light source highlighting a significantly altered surface texture. This is particularly evident in comparison with FIG. 3. By changing the angle of incidence of the light alone, it is possible, for example, to display switches and/or pushbuttons with several functions or additional events on the surface and to visually highlight/hide them in a switchable manner.

Figure 5:
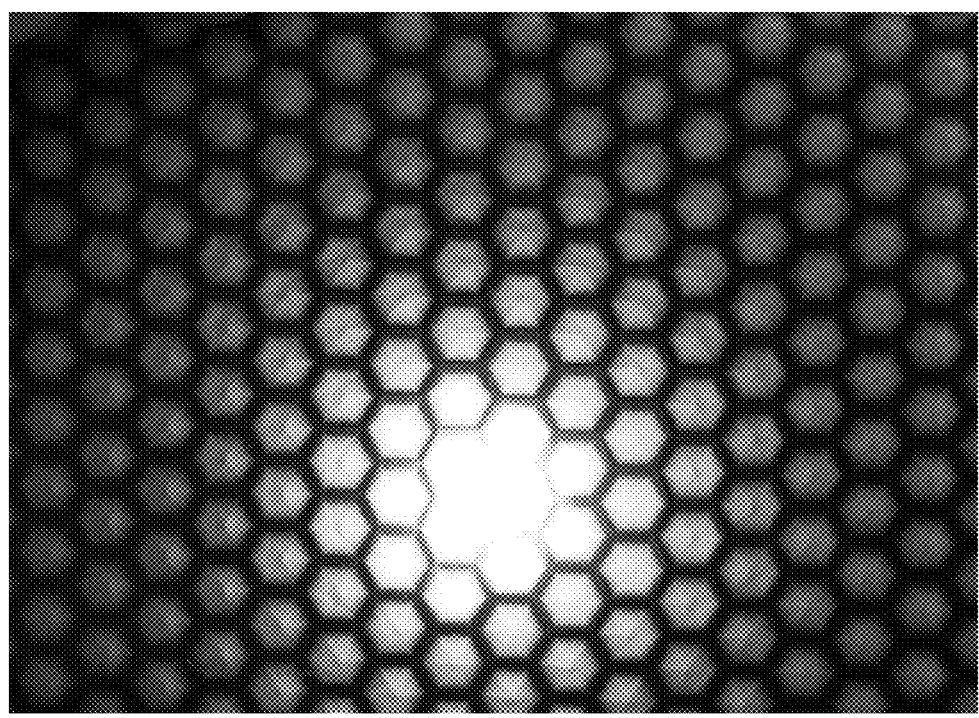
FIG. 5 the front side of the workpiece coated according to the disclosure of FIGS. 1 to 4 with variation of the angle of incidence of the light source with light incidence from the rear side.

FIG. 5 also shows an arrangement according to the invention identical to the workpiece of FIGS. 1 to 2, consisting of a workpiece surface, a coating on the back with two complementary colors, but with the additional coupling of white light into the workpiece by a point light source. Compared to FIG. 3 and FIG. 4, the angle of incidence of the point light source has been changed, the light is coupled directly into the workpiece from the rear side. The height levels of the relief are less prominent under this angle of incidence. Instead, the contours of the honeycomb relief, which are difficult to see without incident light, are clearly emphasized. This change in turn allows different functions to be displayed on switches or buttons. This can facilitate the application situation. In particular, functional areas can be specifically highlighted and hidden again. The complexity of the application situation can be specifically influenced and controlled by the arrangement according to the invention.

What is claimed is:

1. An arrangement comprising: a workpiece structured at least in partial surface areas in a 3-dimensional manner, at least comprising a decoration applied above and/or below the structured surface of the workpiece, and at least one illumination source, wherein the decoration comprises at least in part at least two different coating materials, wherein the quantity of a first coating material of the at least two different coating materials applied in a location-specific manner to the structured workpiece correlates with the height of the 3-dimensionally structured surface of the workpiece at this location, and the quantity of a second coating material of the at least two different coating materials at this location is inversely proportional to the quantity of the first coating material, wherein the 3-dimensionally structured workpiece surface is at least partially translucent and the illumination source is set up to couple light either laterally and/or at the rear and/or at the front into the workpiece surface.

2. The arrangement according to claim 1, wherein the workpiece is made of a material selected from the group consisting of polycarbonate, polystyrene, polymethyl methacrylate, polymethacryl methylimide, polyvinyl chloride, polyethylene terephthalate, glass, or combinations of at least two materials thereof, and the thickness of the workpiece is greater than or equal to 1.5 mm and less than or equal to 2 cm.

3. The arrangement according to claim 1, wherein the transmission of the workpiece, averaged over the workpiece surface, in a wavelength range of greater than or equal to 380 nm and less than or equal to 750 nm, is greater than or equal to 15% and less than or equal to 100%.

4. The arrangement according to claim 1, wherein the ratio of maximum elevation of the textured and undecorated workpiece surface to average workpiece thickness, expressed as maximum thickness from the back of the workpiece divided by the average workpiece thickness, is greater than or equal to 1.1 and less than or equal to 3.

5. The arrangement according to claim 1, wherein the illumination source is adapted to couple light back and laterally into the workpiece.

6. The arrangement according to claim 1, wherein the arrangement additionally comprises a control unit and a detection unit, wherein the detection unit is adapted to detect an approach to the arrangement and to output a corresponding signal to the control unit, and the control unit is adapted to control the coupling of the light as a function of the output signal of the detection unit.

7. The arrangement according to claim 6, wherein the arrangement comprises at least two different illumination sources, wherein both illumination sources are controlled independently of each other in their optical properties via the control device.

8. The arrangement according to claim 1, wherein the coating material is selected from the group consisting of curable liquid with color pigments, curable liquid with metal particles, curable lacquers, or combinations of at least two materials thereof.

9. The arrangement according to claim 2, wherein the decor comprises at least two different coating materials having different colors according to the HSV color wheel, wherein the at least two location-sensitively applied colors on at least 75% of the printed area on the HSV color wheel include an angle greater than or equal to 170° and less than or equal to 190° or have at least a difference of 30 percentage points in their lightness value.

10. The arrangement according to claim 1, wherein the decor comprises at least two coating materials having different reflectance and/or absorption properties in the visible light wavelength range, wherein at least two of the location-sensitively applied coating materials have an integral difference in light absorption in the range from 280 nm to 780 nm of greater than or equal to 50%.

11. The arrangement according to claim 1, wherein the workpiece surface is, at least in sections, single or double curved and the curvature of one or both curvatures is greater than or equal to 0.001 mm and less than or equal to 0.5 mm.

12. The arrangement according to claim 1, wherein the workpiece is a decoration of a vehicle or a means of transport.

* * * * *